(12) United States Patent
Erden et al.

(10) Patent No.: US 9,123,384 B2
(45) Date of Patent: Sep. 1, 2015

(54) REQUIREMENT RELAXATION FOR MULTIPLE READERS IN PRESENCE OF LARGE SKEW ANGLE RANGE

(71) Applicant: Seagate Technology LLC, Cupertino, CA (US)

(72) Inventors: Mehmet Fatih Erden, St. Louis Park, MN (US); Scott Warmka, Burnsville, MN (US); Barmeshwar Vikramaditya, Eden Prairie, MN (US); Ralph William Cross, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/665,150

(22) Filed: Mar. 23, 2015

(65) Prior Publication Data
US 2015/0194182 A1    Jul. 9, 2015

Related U.S. Application Data

(63) Continuation of application No. 14/100,527, filed on Dec. 9, 2013, now Pat. No. 8,988,802.

(51) Int. Cl.
    *G11B 21/02*     (2006.01)
    *G11B 20/20*     (2006.01)
    *G11B 20/10*     (2006.01)

(52) U.S. Cl.
    CPC ............................ *G11B 20/10388* (2013.01)

(58) Field of Classification Search
    None
    See application file for complete search history.

(56) References Cited

U.S. PATENT DOCUMENTS

| | | | |
|---|---|---|---|
| 5,223,993 | A | 6/1993 | Squires et al. |
| 6,157,510 | A | 12/2000 | Schrek et al. |
| 7,106,549 | B2 | 9/2006 | Asakura |
| 7,271,970 | B2 | 9/2007 | Tsuchiya |
| 7,274,530 | B2 | 9/2007 | Wilson et al. |
| 7,570,451 | B2 | 8/2009 | Bedillion et al. |
| 7,982,994 | B1 | 7/2011 | Erden et al. |
| 8,139,301 | B1 | 3/2012 | Li et al. |
| 8,599,508 | B1 | 12/2013 | Burd |
| 8,711,517 | B2 | 4/2014 | Erden et al. |

OTHER PUBLICATIONS

File History for U.S. Appl. No. 14/100,527 as retrieved from the U.S. Patent and Trademark Office.

*Primary Examiner* — K. Wong
(74) *Attorney, Agent, or Firm* — Hollingsworth Davis, LLC (57) ABSTRACT

A readback signal from a first reader and a readback signal from a second reader are received, the first reader and the second reader configured to read two-dimensional data from at least one track of a recording media. A quality metric of the second reader is measured based on the readback signal. It is determined if the quality metric for the second reader is above a threshold. If the quality metric is above the threshold, the first reader and the second reader are used to read the data.

20 Claims, 12 Drawing Sheets

REQUIREMENT RELAXATION FOR MULTIPLE READERS IN PRESENCE OF LARGE SKEW ANGLE RANGE

RELATED PATENT DOCUMENTS

This application is a continuation of patent application Ser. No. 14/100,527 filed on Dec. 9, 2013 which is incorporated herein by reference in its entirety.

SUMMARY

Some embodiments involve a method of receiving a readback signal from a first reader and a readback signal from a second reader, the first reader and the second reader configured to read two-dimensional data from at least one track of a recording media. A quality metric of the second reader is measured based on the readback signal. It is determined if the quality metric for the second reader is above a threshold. If the quality metric is above the threshold, the first reader and the second reader are used to read the data. In some cases the first and the second reader are configured to read a first track and a second track, respectively if the quality metric is above the threshold. If the quality metric is not above the threshold, only the first reader is used to read the data.

Some embodiments involve an apparatus comprises a first reader and a second reader positioned symmetrically about a pivot point, at least two read sensors configured to concurrently read two-dimensional data from at least one track of a recording media. A controller is configured to measure a quality metric of the second reader based on the readback signal, determine if the quality metric for the second reader is above a threshold, and use the first reader and the second reader to read the data if the quality metric is above the threshold.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates generally to the field of magnetic data storage systems. In particular, the present disclosure relates to a magnetic read head with multiple read transducers. Multiple read transducers disposed on the same physical plane in close proximity (such as on adjacent read tracks) offer the potential for increased read data rates and process. This is sometimes referred to as two-dimensional magnetic recording (TDMR).

Two-dimensional magnetic recording employs multiple-dimension encoding of data that is subsequently decoded for processing multiple data tracks. In addition to increasing areal density, TDMR may provide increased read-back data rate with a reduced channel buffer if data from the multiple data tracks are read concurrently. However, placing the read transducers in such an arrangement creates design and process difficulties due to skew sensitivity and wafer process cost. For example, the configuration of a transducing element capable of reading multiple data tracks simultaneously can be plagued by skew angle induced track misalignment at various skew angles between the multiple readers, especially with devices employing reduced data track widths. This skew angle induced track misalignment can cause one of more of the readback signals to be unreliable because of increased noise from another track, for example. In systems with reduced track widths to increase data density, multiple readers are placed close together making a skew angle misalignment more pronounced.

Using a system that selectively uses the readback signals of additional readers may allow for a relaxation of the spacing between the readers and the skew angle. A quality metric may be determined for one or more additional readers. The readback signal from one or more additional readers may be used if a quality metric is above a threshold. If the quality metric is not above the threshold, the readback signals may be used in combination with the other readback signals to read the first track and/or may not be used at all.

The quality metric is determined from the read channel, which processes the analog signals read from the media. Generally, the read channel attempts to detect digital symbols based on the analog signals. The read channel may be able to detect signal quality measures such as signal-to-noise ratio, signal strength, likelihood that a detected signal maps to a set of symbols, etc. These measures may be used to determine a quality metric of the track signals.

Figure 1:
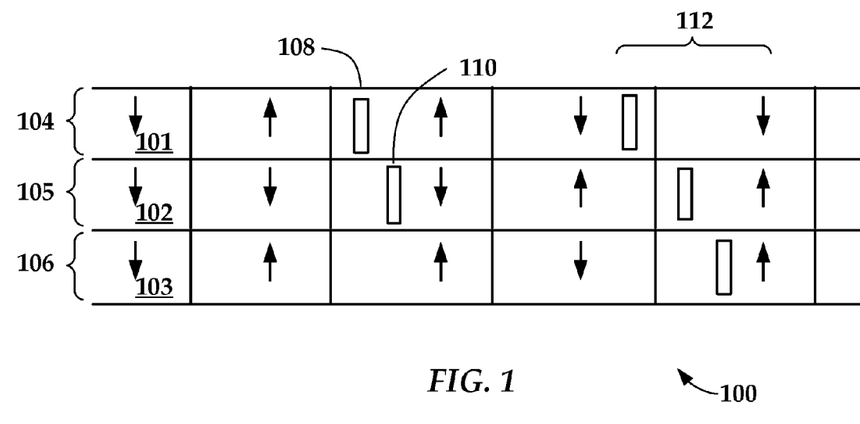
FIG. 1 is a block diagram that illustrates an example of reading two-dimensional tracks according to some implementations.

In reference now to FIG. 1, a block diagram illustrates an example of reading two-dimensional tracks according to an example embodiment. The blocks (e.g., blocks 101-103) represent bits written in respective tracks 104-106 on a magnetic media surface 100. Although the blocks 101-103 are shown aligned to each other from track-to-track, this is not required. The arrows within the blocks represent magnetic orientations that will be sensed as ones or zeros by a reader, e.g., by read transducers 108 and/or 110. While two read transducers 108, 110 are shown, a similar effect may be achieved with two passes of a single read transducer, albeit with an increase in latency. More than two read transducers may be used, as indicated by transducer array 112.

The read transducers 108, 110 may include magnetoresistive transducers, such as giant magnetoresistance (GMR) sensor, tunneling magnetoresistance (TMR) sensor, etc. Generally, these types of transducers include layers of magnetic and non-magnetic materials that change resistance in response to local magnetic fields. A current is passed through the sensor while the media moves underneath. The resulting signal is used to read bits on the tracks 104, 105.

Figure 2:
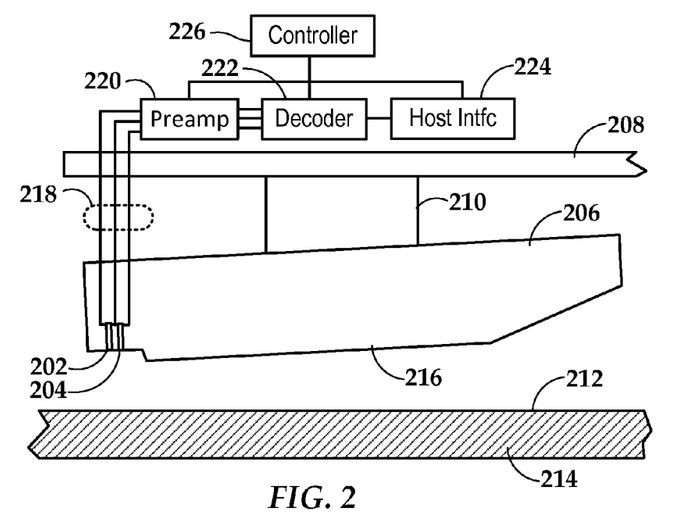
FIG. 2 illustrates a hard disk data storage device according to embodiments described herein.

The read transducers and media shown in FIG. 1 may be part of a hard disk data storage device. Details of such a device according to an example embodiment are shown in FIG. 2. Generally, read transducers 202, 204 are housed at a trailing edge of a slider 206, also sometimes referred to as a read/write head. The slider 206 is coupled to arm 208 by way of a suspension 210 that allows some relative motion between the slider 206 and arm 208. In addition to the read transducers 202, 204, the slider 206 may include one or more write transducers (not shown), such as a write pole and coil. When the slider 206 is located over surface 212 of a magnetic disk 214, a flying height is maintained between the slider 206 and surface 212 by a downward force of arm 208. This downward force is counterbalanced by an air cushion that exists between the surface 212 and an air bearing surface 216 of the slider 206 when the disk 214 is rotating.

Changes in local magnetic field caused by the moving disk 214 induce a change in resistance of the read transducers 202, 204. The read transducers are coupled to a preamplifier 220 by way of signal lines 218. Generally, the preamplifier 220 amplifies and conditions the analog signals (which may include a two-dimensional signal) received via signal lines 218, the amplified signals being used for other processing modules such as decoder 222. The decoder 222 determines a digital output from the analog signals, the digital output being used by a host via host interface 224, as well as other system components (not shown). The processing of the signals and data is generally managed by a controller 226, which may include a microprocessor and other logic circuits.

Figure 3:
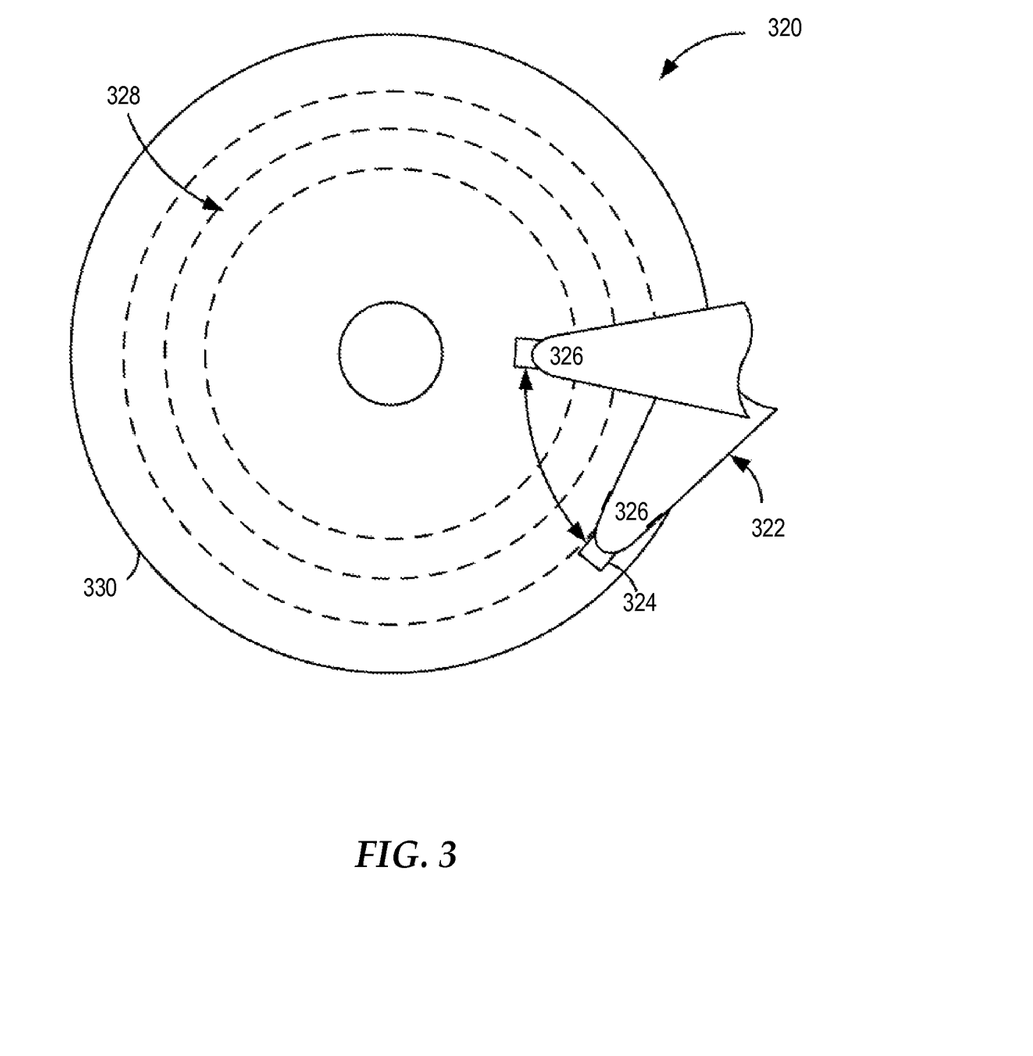
FIG. 3 displays a top view block representation of a data transducing assembly capable of being used in the data storage device of FIG. 2

FIG. 3 displays a top view block representation of a data transducing assembly 320 capable of being used in the data storage device of FIG. 2. An actuating portion 322 of the data transducing assembly 320 has at least a slider 324 and load beam 326 that translate to access various data tracks 328 of a data storage media 330. As shown, rotation of the actuating portion 322 modifies the angular orientation of the slider 324 in relation to the data tracks 128 in what can be called the skew angle of the actuating portion 322. The relative positioning, size and rotation angles are for illustrative purposes only and should not be interpreted as limiting.

In TDMR, multiple data transducers access adjacent data tracks to obtain data that is processed jointly to increase areal data bit density. However, simply constructing and operating a transducing assembly 320 with any arbitrary configuration of multiple readers does not guarantee alignment with adjacent data tracks for all ranges of skew angles. For example, configuring a transducing assembly 320 with a pivot point oriented on a reader can provide data track alignment at zero skew angle, but may be susceptible to inter-track interference and misalignment with data tracks at high skew angles, e.g., −/+14°, due at least in part to separate shield structures for multiple read heads.

Figure 4A:
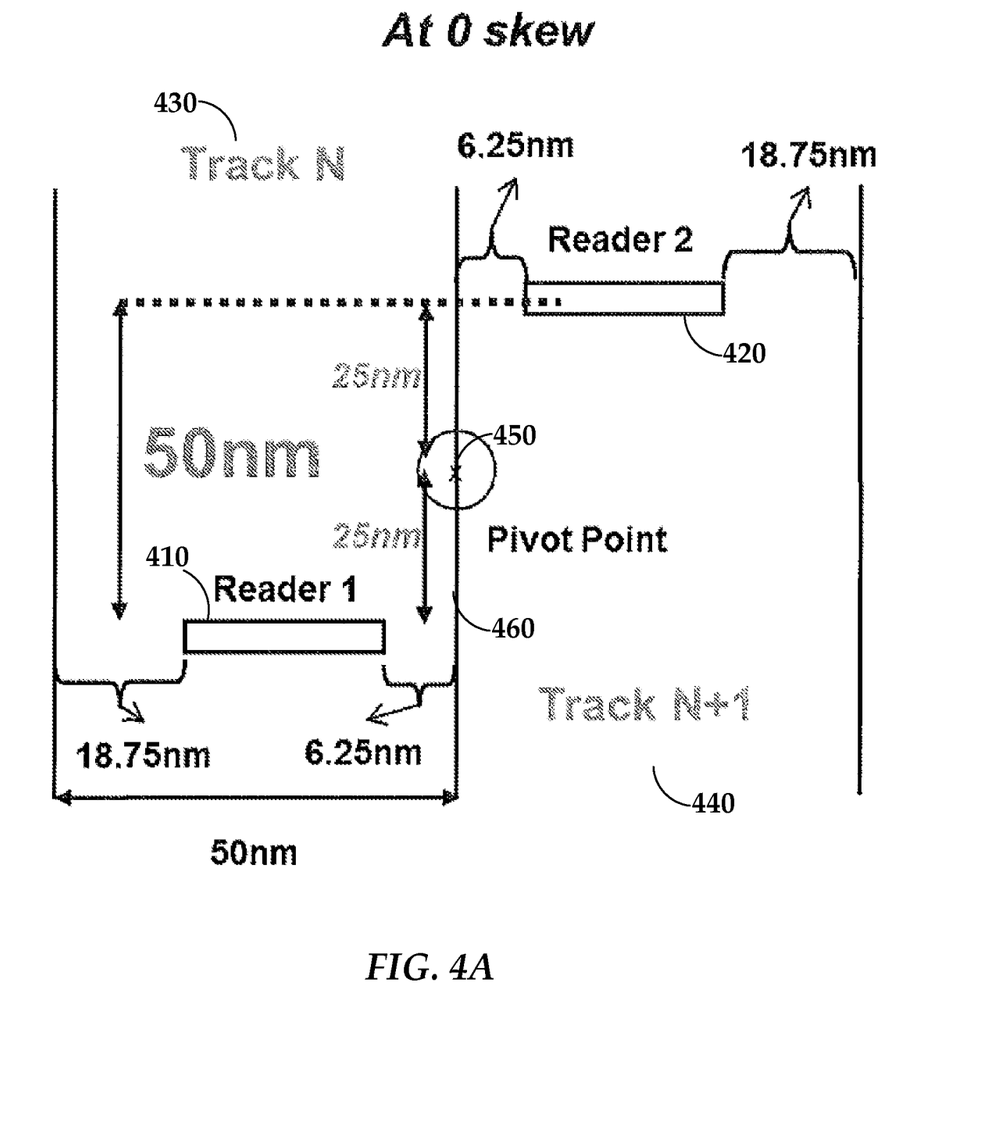
FIGS. 4A-4C illustrate three examples having different skew angles between two readers according to some aspects.
Figure 4B:
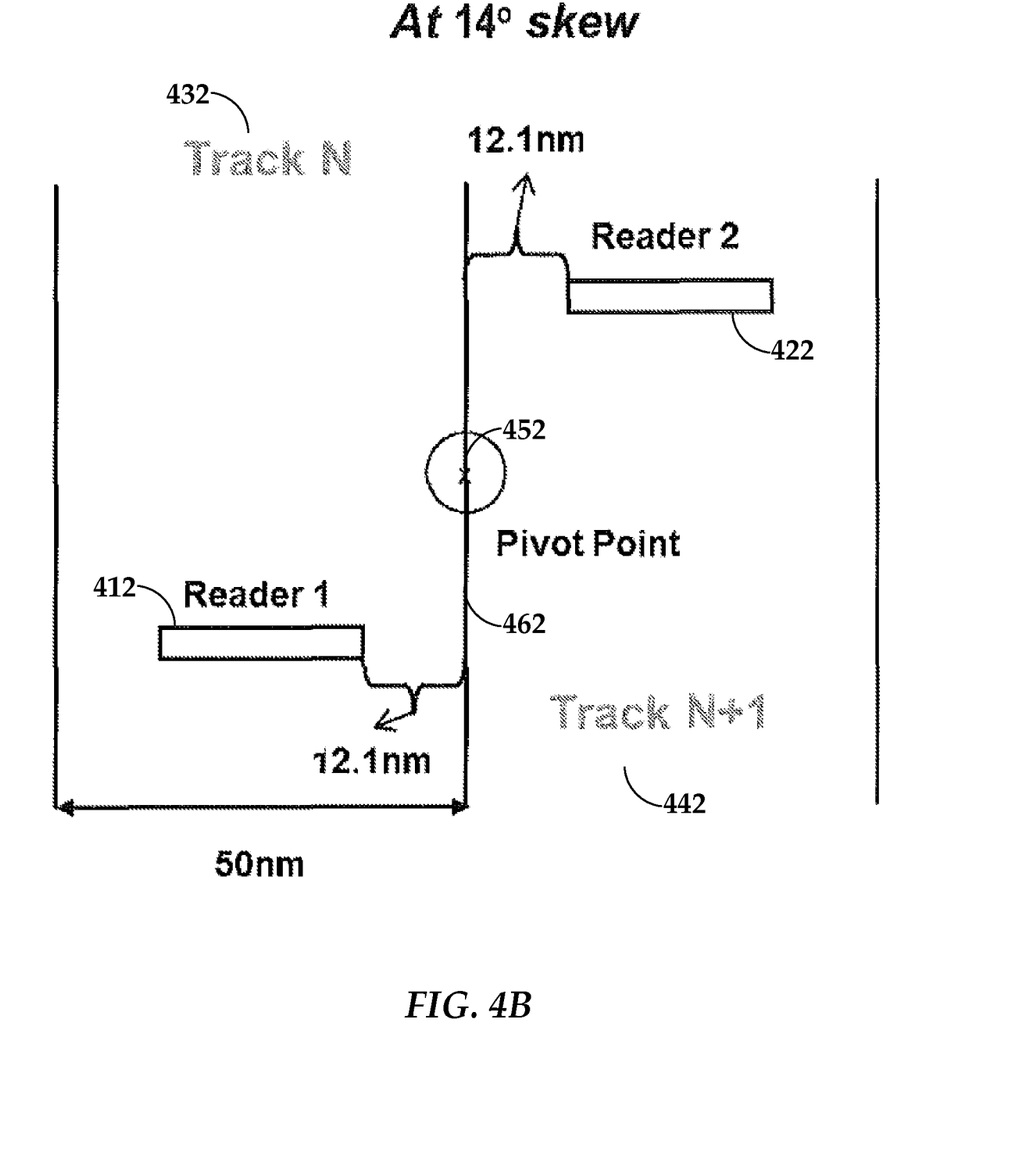
Figure 4C:
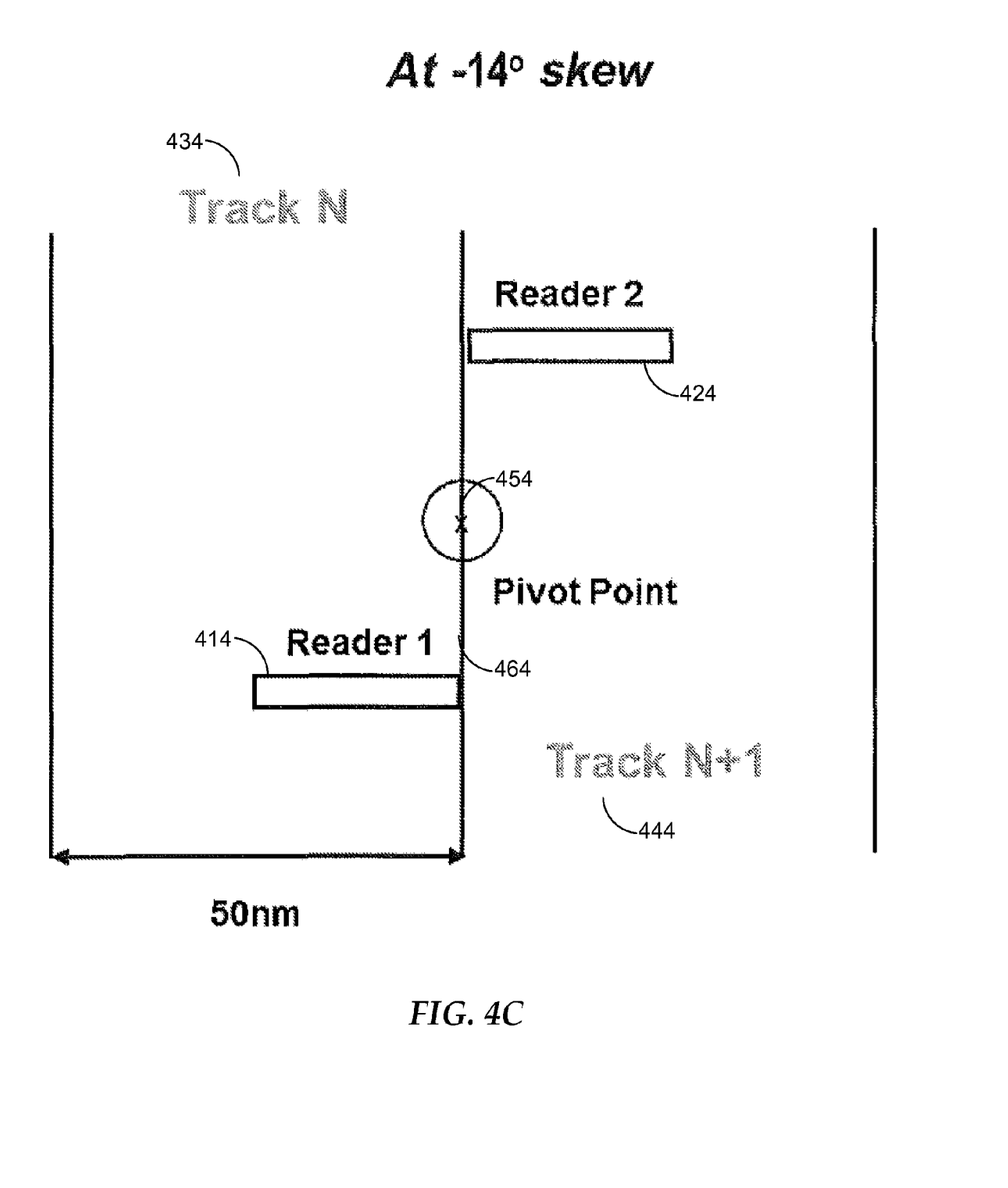

FIGS. 4A-4C illustrate three examples having different skew angles between two readers. In each of the figures, a first reader 410, 412, 414 and a second reader 420, 422, 424 are placed in a respective first track 430, 432, 432 and a second track 440, 442, 444. The first reader and the second reader are rotated about a pivot point 450, 452, 454 along a track edge 460, 462, 464 between the non-overlapping first track 430, 432, 432 and second track 440, 442, 444. In this example, the dimensions shown are based on a 50 nm track pitch. FIGS. 4A-4C can be scaled for another track pitch, for example, a 40 nm track pitch.

FIG. 4A shows an example in which there is 0 degree skew angle between the first reader 410 and the second reader 420. As can be observed in the figure, both of the readers 410, 420 are in their respective tracks 430, 440. According to various implementations, the closer that a reader is to an adjacent track, the more interference from that adjacent track that the reader experiences.

FIG. 4B illustrates the same system as in FIG. 4A, but with a 14 degree skew angle (clockwise rotation around the pivot point 452) between the first reader 412 and the second reader 422. In this case, the readers 412, 422 are close to center on the respective tracks 432, 442 and are further apart than the example illustrated in FIG. 4A. Because of the greater distance between the track edge 462, and the first reader 412 and the second reader 422, less interference is experienced than in the example in FIG. 4A.

FIG. 4C shows another example in which the readers have a −14 degree skew angle (counter-clockwise rotation around the pivot point 454). In this case, the first reader 414 and the second reader 424 are positioned in their respective tracks 434, 444, but are closer to the track edge 464 than in the examples shown in FIGS. 4A and 4B. The small spacing between the readers and the adjacent track may cause more interference in the system.

Figure 5:
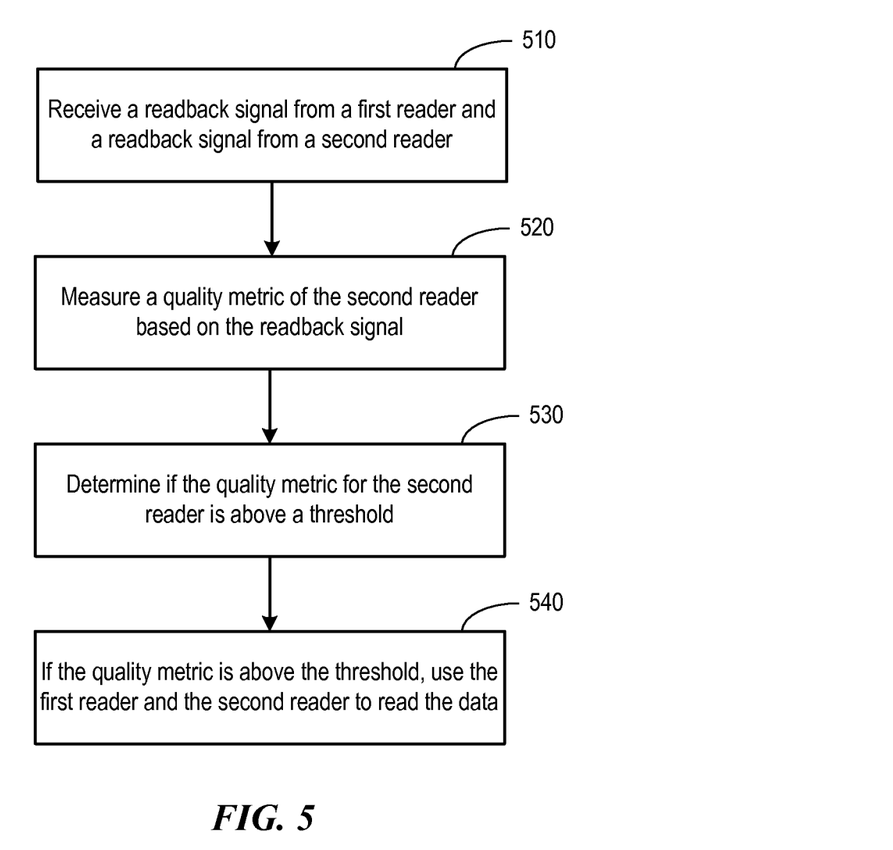
FIGS. 5-7 are a flow diagram that describe using a quality metric in a TDMR system in accordance with embodiments described herein.

Using a system that selectively uses the readback signals of additional readers based on a quality metric of the readers allows for a relaxation of the spacing and skew angle constraints. FIG. 5 is a flow diagram that describes using a quality metric in a TDMR system in accordance with embodiments described herein. A readback signal is received 510 from a first reader and a second reader, respectively. The first reader and the second reader may be configured to read two-dimensional data from a track of a recording media. A quality metric is measured 520 of the second reader based on the readback signal. It is determined 530 if the quality metric for the second reader is above a threshold. If the quality metric is above the threshold, the first reader and the second reader are used 540 to read the data. In some cases, using the first reader and the second reader to read the data increases a data rate of the system.

Figure 6:
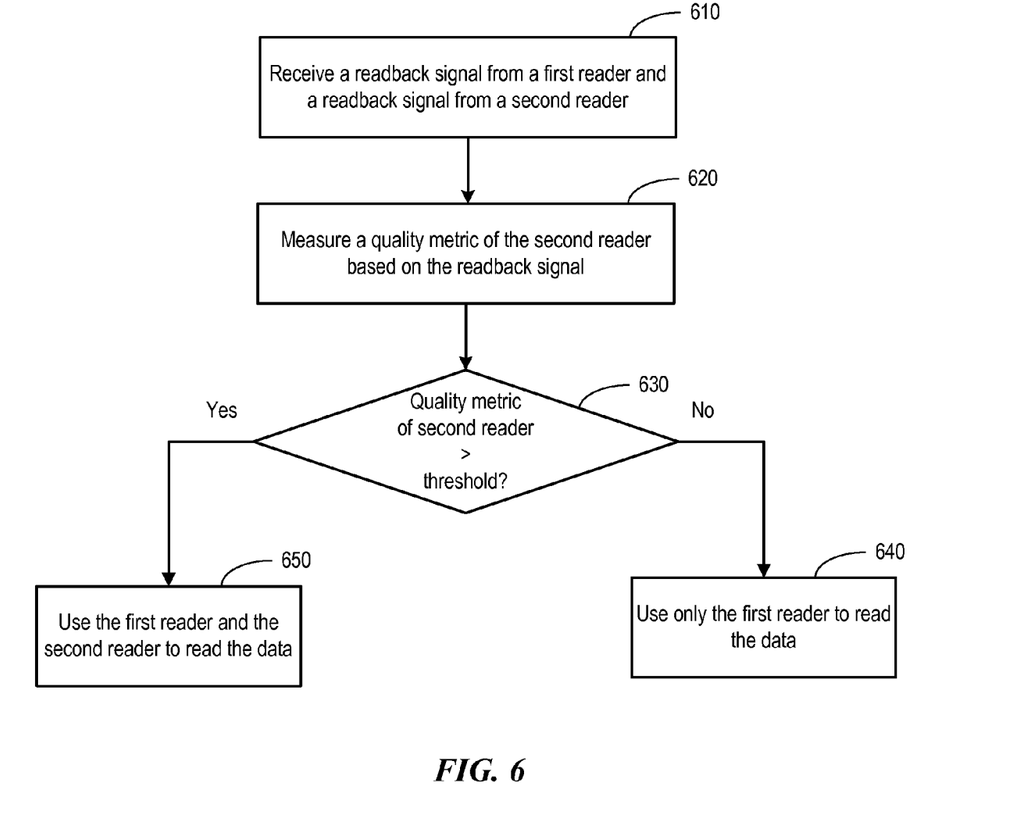

FIG. 6 is another flow diagram in accordance with various implementations. A readback signal is received 610 from a first reader and a second reader, respectively. A quality metric is measured 620 of the second reader based on the readback signal. It is determined 630 whether the quality metric is above a threshold. If it is determined 630 that the quality metric is not above the threshold, only the first reader is used 640 to read the data. If it is determined 630 that the quality metric is above the threshold, the first reader and the second reader are used 650 to read data.

Figure 7:
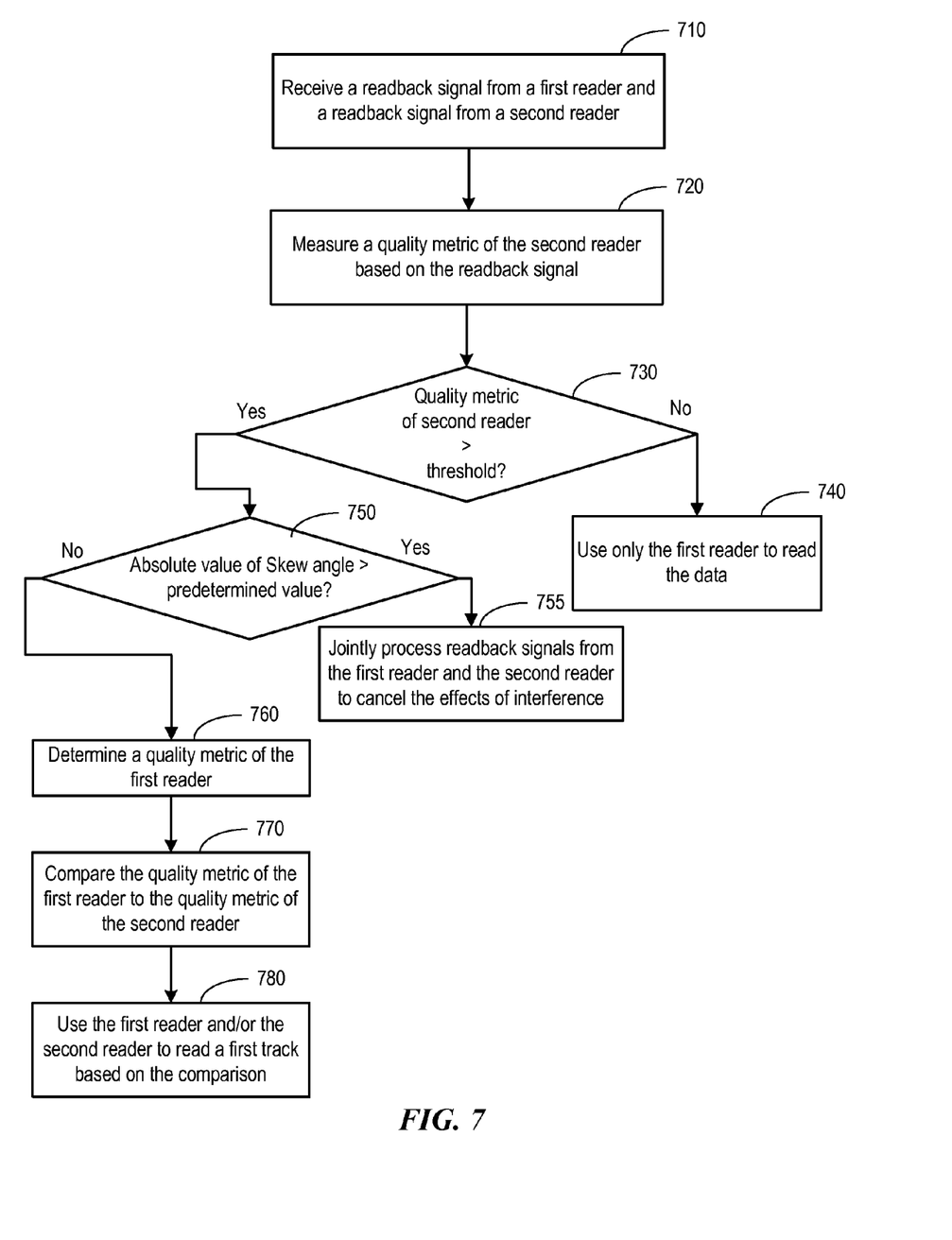

FIG. 7 shows a more detailed flow diagram in accordance with embodiments described herein. A readback signal is received 710 from a first reader and a second reader, respectively. A quality metric is measured 720 of the second reader based on the readback signal. It is determined 730 whether the quality metric is above a threshold. If it is determined 730 that the quality metric is not above the threshold, only the first reader is used 740 to read the data. The data may be data on two separate tracks in which the first reader is configured to read data in a first track and the second reader is configured to read data in a second track. If it is determined 730 that the quality metric is above the threshold, the first reader and the second reader are used to read data in their respective tracks, for example.

If it is determined 730 that the quality metric of the second reader is above the threshold, a value of the radius of the data being read in retrieved from a zone table. A zone table is a data structure that maps circumferential zones to ranges of track identifiers. Each of the zones utilize different numbers of sectors per revolution to more efficiently store data on the circular disk. Thus, the zone table can be used to determine a physical distance of the read head from the center of the disk, which also corresponds to the skew angle of the readers.

It is determined 750 whether an absolute value of a skew angle between the first reader and the second reader is above a predetermined value. According to various embodiments, if it is determined 750 that the skew angle is above the predetermined value the readback signal from the first reader and the readback signal from the second reader are jointly processed 755 to cancel the effects of interference in the system. If it is determined 750 that the skew angle is not above the predetermined value, the readback signal from the first reader and the readback signal from the second reader may be used to read the first track and the second track, respectively. In some cases, the readback signals from both of the first reader and the second reader are used to read data in a first track. If the skew angle is not above the predetermined value, quality metric of the first reader is determined 760. The quality metric of the first reader is compared 770 to the quality metric of the second reader. The first reader and/or the second reader is used 780 to read a first track based on the comparison of the respective quality metrics. For example, if the quality metric of the first reader is greater than the quality metric of the second reader, only the first reader may be used to read the first track. In some cases, a weighted average is calculated from the readback signals of the first and second readers and the weighted average is used to read the first track. The weighted average may be based on the respective quality metrics of the first reader and the second reader, for example.

According to various embodiments, a skew offset may be introduced to the readers when the readers reading tracks in specific locations on the media. For example, the skew offset may be introduced at tracks along an outer diameter of the media. The skew offset may be introduced by skewing the slider or offsetting the reader elements cross-track to effectively introduce a skew offset. This skew offset may allow multiple readers to read multiple tracks at the outer diameters. In some cases, the readers are configured to read a main track at middle or inner diameter tracks and multiple tracks at outer diameter tracks. In some cases the first reader and the second reader are configured to read a first and a second track, respectively, if the at least one track of recording media is positioned in an outer diameter or an inner diameter of the recording media. This may allow increased system performance, for example, by increasing the data rate. According to various aspects, the first reader and the second reader are configured to read only the first track if the at least one track of recording media is positioned in middle diameter of the recording media. This may allow the system to have increased capacity.

According to some implementations, one or more of the readers may be configured to provide interference cancellation at the inner tracks and/or the outer tracks. The reader providing interference cancellation may also be used to read data. For any given system design, data recovery may be different depending on whether the readers are on the same track, part of the same track, detecting interference from adjacent track, or on separate tracks. Averaging of the multiple read signals might be done first before utilizing interference among the signals, or vice versa.

According to some embodiments, down-track subtraction from one reader if the other is detecting written-in track edge noise is applied. Down-track subtraction can be done without knowing (or recovering) the adjacent track pattern. In some cases, only down-track timing information is determined. In a recovery mode, it may also be possible to run these different back-to-back and use one to seed/initiate the other.

Figure 8A:
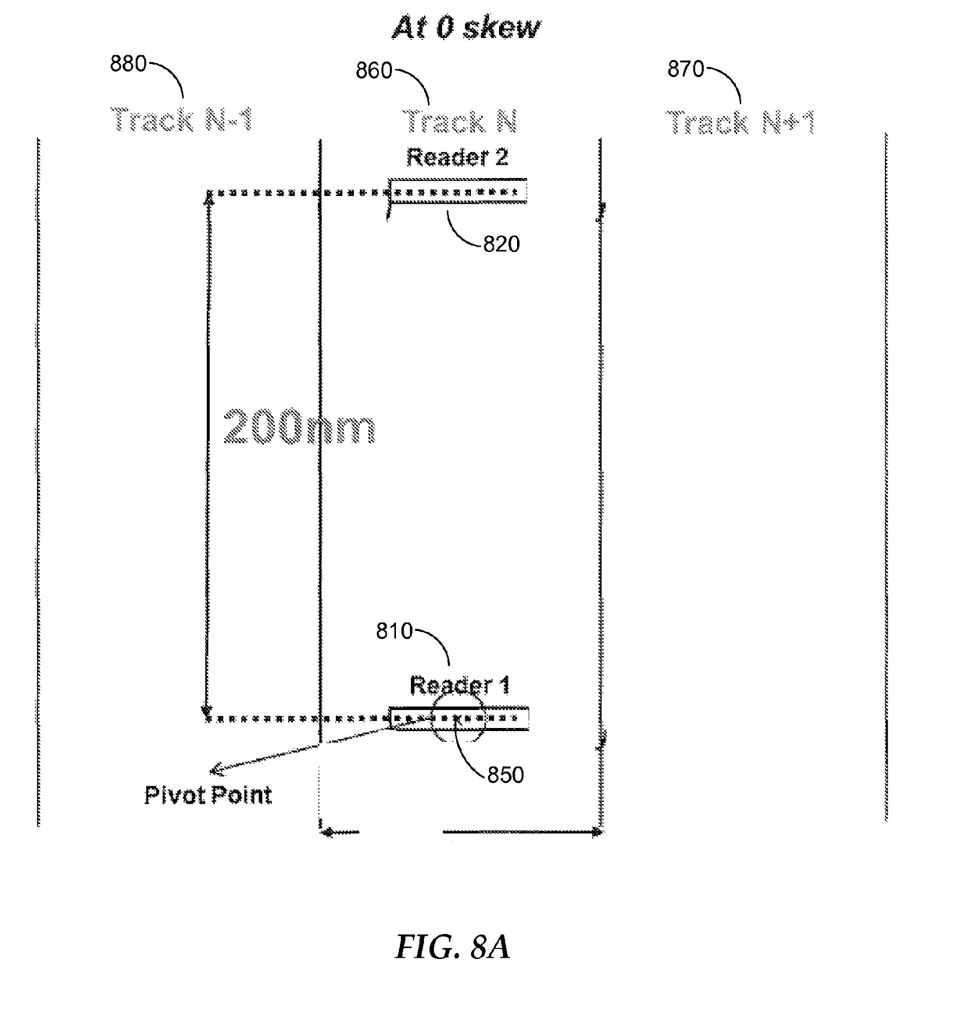
FIGS. 8A-8D show example reader positions for the flow charts described in conjunction with FIGS. 5-7 according to some implementations.
Figure 8B:
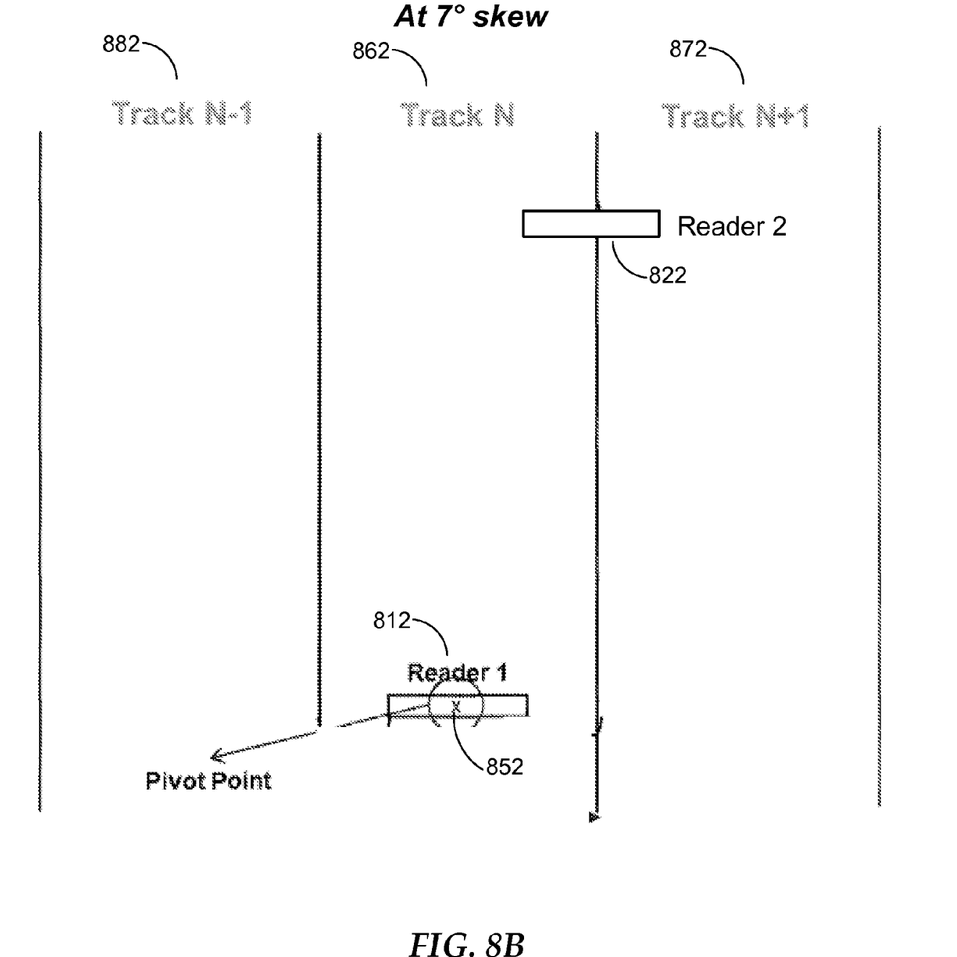
Figure 8C:
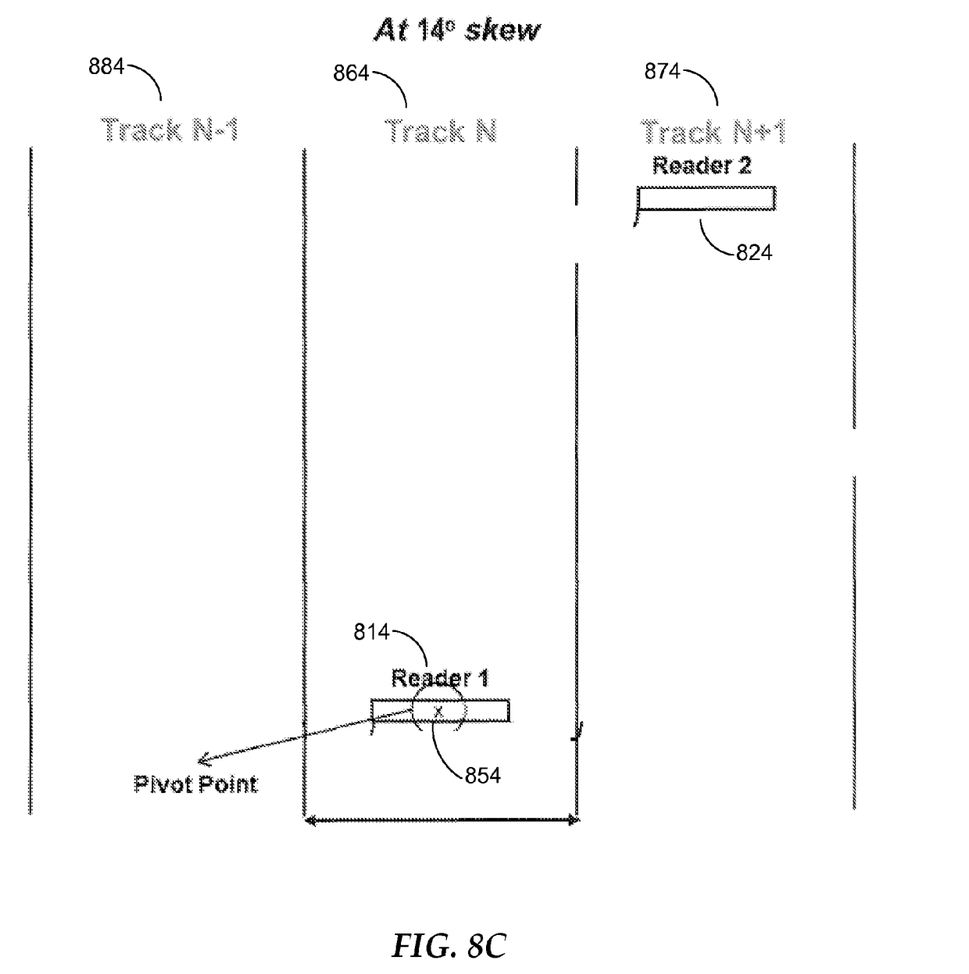

FIGS. 8A-8D show example reader positions for the flow charts described in conjunction with FIGS. 5-7. FIGS. 8A-8C are shown using the same track dimensions as in FIGS. 4A-4B, but the distance between the readers has been increased to 200 nm up from 50 nm. In this example, the increased reader distance facilitates both readers being aligned to read the same track at some skew angles (e.g., zero skew), and multiple tracks at other angles. Determining whether to use a first reader and/or a second reader based on a quality metric allows the distance to be increased between the readers. Each of FIGS. 8A-8D shows a first reader 810, 812, 814, 816 and a second reader 820, 822, 824, 826. The first and the second readers rotate about a pivot point 850, 852, 854, 856 positioned on the first reader 810, 812, 814, 816. The pivot point defines the cross-track displacements of the readers as a function of skew angle, for example. FIGS. 8A-8D illustrate three tracks: Track N 860, 862, 864, 866; Track N+1 870, 872, 874, 876; and Track N-1 880, 882, 884, 886.

FIG. 8A shows an example with 0 degree skew. In this case, bother the first reader 810 and the second reader 820 are within Track N and are used to read Track N. Because the first reader and the second reader are not close to any other tracks, both the first reader and the second reader are likely to have a high quality metric that is above the threshold and both the first reader and the second reader may be used to read Track N. As described above, the readback signal from the first reader and the readback signal from the second reader may be averaged to improve the quality of the readback signal. In some cases, it may be determined whether the first reader or the second reader has the highest quality metric and only that reader is used to read the data. According to various implementations, the reader with the highest quality metric is weighted more heavily in a weighted average of the readback signals than a reader with a lower quality metric.

FIG. 8B illustrates an example in which the skew angle between the first reader 812 and the second reader 822 has increased to 7 degrees. In this case, the first reader 812 is still centered on Track N 862 as in FIG. 8A. The second reader 822 is now partially spanning both Track N 862 and Track N+1 872. In this case, the quality metric of the second reader 822 is likely lower than the threshold because the readback signal includes data from two different tracks. In this case, only the signal coming from the first reader 852 is used to read the data in Track N 862.

FIG. 8C shows another example in which the skew angle between the first reader 814 and the second reader 824 has increased to 14 degrees. In this case, the first reader 814 is still centrally located in Track N 864. The second reader 824 is centrally located in Track N+1 874. The quality metrics for both the first reader 814 and the second reader 824 are likely higher than the threshold since both readers 814, 824 are centrally located in their respective tracks 864, 874. The system will use the readback signal from the first reader 814 to read the data in Track N 864 and the readback signal from the second reader 824 to read the data in Track N+1 874.

Figure 8D:
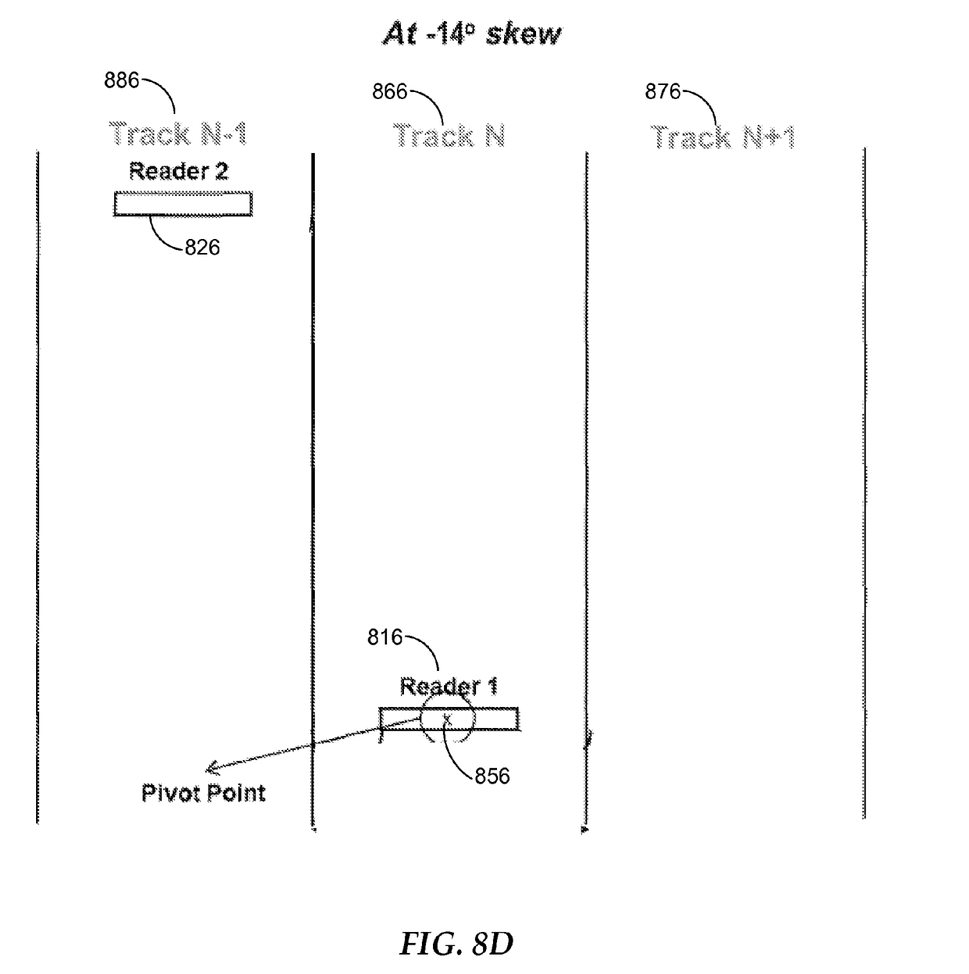

FIG. 8D is similar to FIG. 8C except that the skew angle between the first reader 816 and the second reader 826 is -14 degrees instead of 14 degrees. Again, the quality metrics for both the first reader 816 and for the second reader 826 are likely high since both of the readers 816, 826 are centrally located on respective tracks 866, 886. The system will use the readback signal from the first reader 816 to read the data in Track N 866 and the readback signal from the second reader 826 to read the data in Track N-1 886.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method comprising:
   receiving two or more signals from respective two or more readers housed in a head, the two or more readers separated from each other at least in a cross-track direction over a recording medium;
   determining a skew angle of the head; and
   in response to the skew angle being above a predetermined value, using one of the two or more signals to cancel interference in another of the two or more signals.

2. The method of claim 1, further comprising, if the skew angle is not above the predetermined value, reading two or more different tracks of the recording medium via the two or more readers.

3. The method of claim 2, further comprising:
   determining two or more quality metrics each associated with the two or more signals; and
   in response to the a selected one of quality metrics being above a threshold, selecting one of the two or more readers associated with the selected one quality measure to read the two or more different tracks of the recording medium.

4. The method of claim 1, further comprising, if the skew angle is not above the predetermined value, averaging two or more signals to read at least one track of the recording medium.

5. The method of claim 1, wherein using one of the two or more signals to cancel interference in another of the two or more signals comprises subtracting down-track data.

6. The method of claim 5, wherein the down-track data comprises timing data.

7. The method of claim 1, wherein the subtracting of the down-track data is performed in response to detecting written-in track edge noise.

8. An apparatus comprising:
   a controller coupled to two or more readers housed in a read/write head, the two or more readers separated from each other at least in a cross-track direction over a recording medium, the controller configured to perform:
     receiving two or more signals from the two or more readers;
     determining a skew angle of the read/write head; and
     in response to the skew angle being above a predetermined value, using one of the two or more signals to cancel interference in another of the two or more signals.

9. The apparatus of claim 8, the controller further configured to perform, if the skew angle is not above the predetermined value, reading two or more different tracks of the recording medium via the two or more readers.

10. The apparatus of claim 9, the controller further configured to perform:
    determining two or more quality metrics each associated with the two or more signals; and
    in response to the a selected one of quality metrics being above a threshold, selecting one of the two or more readers associated with the selected one quality measure to read the two or more different tracks of the recording medium.

11. The apparatus of claim 8, the controller further configured to perform, if the skew angle is not above the predetermined value, averaging two or more signals to read at least one track of the recording medium.

12. The apparatus of claim 8, wherein using one of the two or more signals to cancel interference in another of the two or more signals comprises subtracting down-track data.

13. The apparatus of claim 12, wherein the down-track data comprises timing data.

14. The apparatus of claim 13, wherein the subtracting of the down-track data is performed in response to detecting written-in track edge noise.

15. A system comprising:
    a read/write head comprising two or more readers separated from each other in a direction over a recording medium; and
    a controller coupled to the read/write head and configured to perform:
      receiving two or more respective signals from the two or more readers;
      determining a skew angle of the read/write head; and
      in response to the skew angle being above a predetermined value, using one of the two or more signals to cancel interference in another of the two or more signals.

16. The system of claim 15, the controller further configured to perform, if the skew angle is not above the predetermined value, reading two or more different tracks of the recording medium via the two or more readers.

17. The system of claim 16, the controller further configured to perform:
    determining two or more quality metrics each associated with the two or more signals; and
    in response to the a selected one of quality metrics being above a threshold, selecting one of the two or more readers associated with the selected one quality measure to read the two or more different tracks of the recording medium.

18. The system of claim 15, the controller further configured to perform, if the skew angle is not above the predetermined value, averaging the two or more signals to read at least one track of the recording medium.

19. The system of claim 15, wherein using one of the two or more signals to cancel interference in another of the two or more signals comprises subtracting down-track timing data.

20. The system of claim 19, wherein the subtracting of down-track timing data is performed in response to detecting written-in track edge noise.

* * * * *